United States Patent [19]
Lane, Jr.

[11] Patent Number: 5,568,940
[45] Date of Patent: Oct. 29, 1996

[54] BELT TIGHTENER FOR A VEHICLE SAFETY BELT SYSTEM

[75] Inventor: Wendell C. Lane, Jr., Romeo, Mich.

[73] Assignee: TRW Vehicle Safety Systems Inc., Lyndhurst, Ohio

[21] Appl. No.: 281,306

[22] Filed: Jul. 27, 1994

[51] Int. Cl.$^6$ .................................................. B60R 22/46
[52] U.S. Cl. .......................... 280/806; 297/480; 180/268
[58] Field of Search ................................ 280/801.1, 808, 280/801.2, 806; 297/480, 482, 483; 180/268

[56] References Cited

U.S. PATENT DOCUMENTS

| | | | |
|---|---|---|---|
| 3,608,963 | 9/1971 | Steere, Jr. | 297/482 |
| 3,871,683 | 3/1975 | Otani | 280/801.1 |
| 3,888,085 | 6/1975 | Larsonneur | 280/806 X |
| 3,917,031 | 11/1975 | Doin et al. | 280/806 X |
| 4,288,098 | 9/1981 | Tsuge et al. | 297/480 X |
| 4,385,775 | 5/1983 | Shimogawa et al. | 280/806 |
| 4,917,210 | 4/1990 | Danicek et al. | 280/806 X |
| 4,999,004 | 3/1991 | Skanberg et al. | 297/480 |
| 5,066,042 | 11/1991 | Föhl | 280/806 |
| 5,104,193 | 4/1992 | Fohl | 102/204 |
| 5,233,925 | 8/1993 | Fohl | 297/480 |
| 5,295,714 | 3/1994 | Fohl | 280/806 |

FOREIGN PATENT DOCUMENTS 3844130  7/1990  Germany ............................... 280/806

Primary Examiner—Christopher P. Ellis
Attorney, Agent, or Firm—Tarolli, Sundheim, Covell, Tummino & Szabo

[57] ABSTRACT

A belt tightener (10) for a vehicle safety belt system is connected to a seat belt buckle (16). A piston (34) located in a cylinder (32) of a driving mechanism (18) is connected to the buckle (16) by a cable (22). A gas generator (38) produces gas in response to a vehicle collision to move the piston (34) and the buckle (16) in a first direction (20) along a longitudinal axis (42) of the cylinder (32). The cylinder (32) is fixedly mounted on a support member (70) with the longitudinal axis (42) of the cylinder (32) extending along the first direction (20). The support member (70) includes a mounting portion (72) connectable to a vehicle (12). A cover (100) defines a chamber (102) in which the support member (70) and the driving mechanism (18) are located. A flexible boot (130) into which the cable (22) extends is connected to the cover (100) and extends between the buckle (16) and the cover (100).

21 Claims, 3 Drawing Sheets

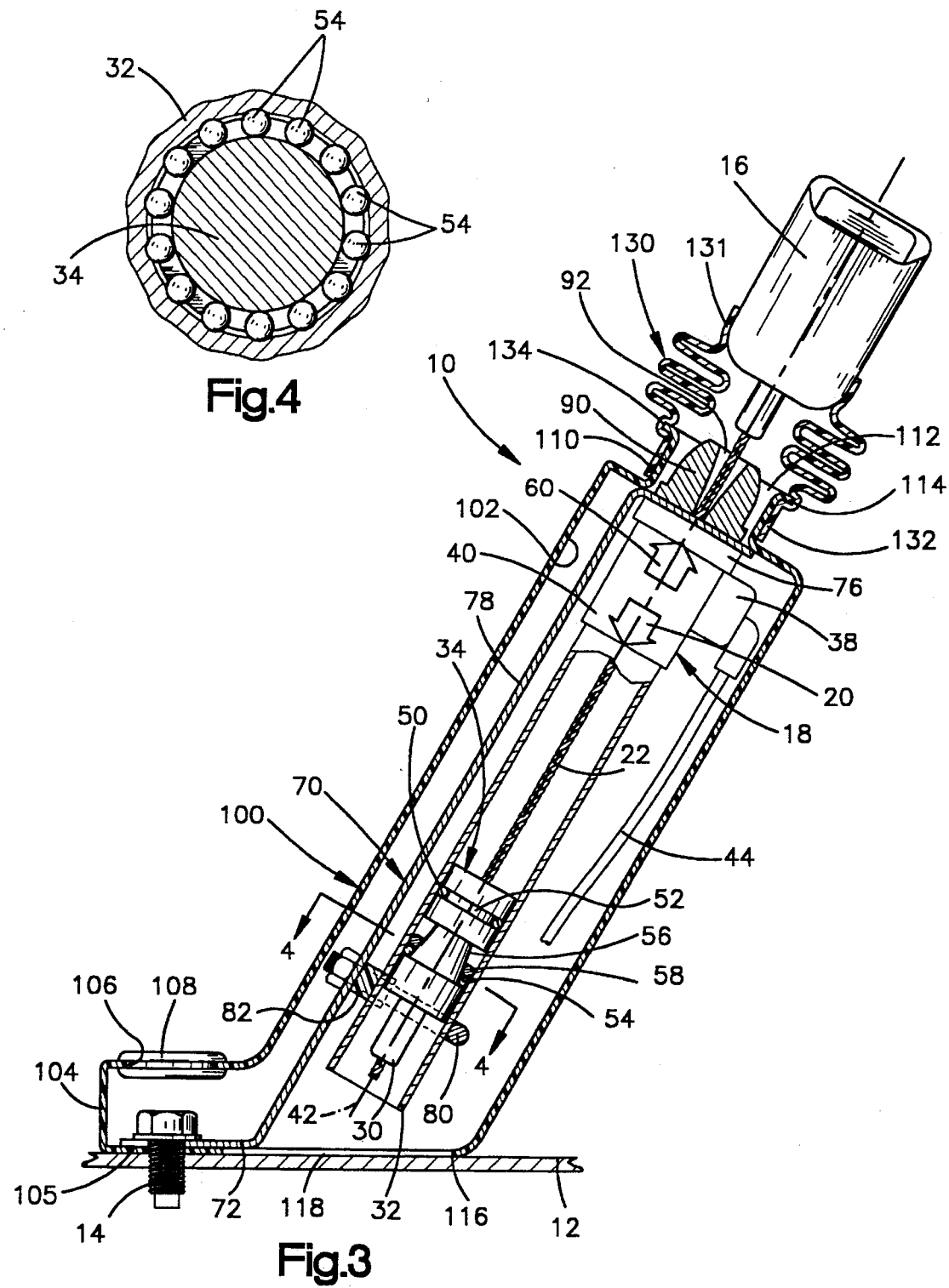

5,568,940

BELT TIGHTENER FOR A VEHICLE SAFETY BELT SYSTEM

BACKGROUND OF THE INVENTION

The present invention relates to a belt tightener for a vehicle safety belt system to tighten belt webbing around an occupant of the vehicle in the event of an accident.

A known belt tightener for a vehicle safety belt system includes a cable extending through a bellows. The cable is connected at its opposite ends to a buckle and a piston, respectively. The piston is located in a cylinder and moves relative to the cylinder in response to deceleration of a vehicle above a predetermined deceleration to move the buckle. It is desirable that such belt tighteners be easily mounted in the vehicle and be hidden by a simply constructed cover.

SUMMARY OF THE INVENTION

The belt tightener of the present invention is connected to a seat belt buckle. A piston located within a cylinder is connected to the buckle by a cable. A gas generator produces gas in response to a vehicle collision to move the piston and the buckle in a first direction along the longitudinal axis of the cylinder. The cylinder is fixedly mounted to a support member with the longitudinal axis of the cylinder extending along the first direction.

The support member and the cylinder are located in a chamber defined by a cover. A flexible boot extends between the buckle and the cover and is connected to the cover. The cover includes a radially outward extending annular flange extending into a groove in the boot to interconnect the cover and the boot.

BRIEF DESCRIPTION OF THE DRAWINGS

The foregoing and other features of the present invention will become more apparent to one skilled in the art upon reading the following description of the present invention with reference to the accompanying drawings, wherein:

FIG. 3 is a sectional view of the belt tightener of FIG. 1 in an activated position; and FIG. 4 is a sectional view of a belt tightener of FIG. 3 taken along the line 4—4 of FIG. 3.

DESCRIPTION OF A PREFERRED EMBODIMENT OF THE INVENTION

Figure 1:
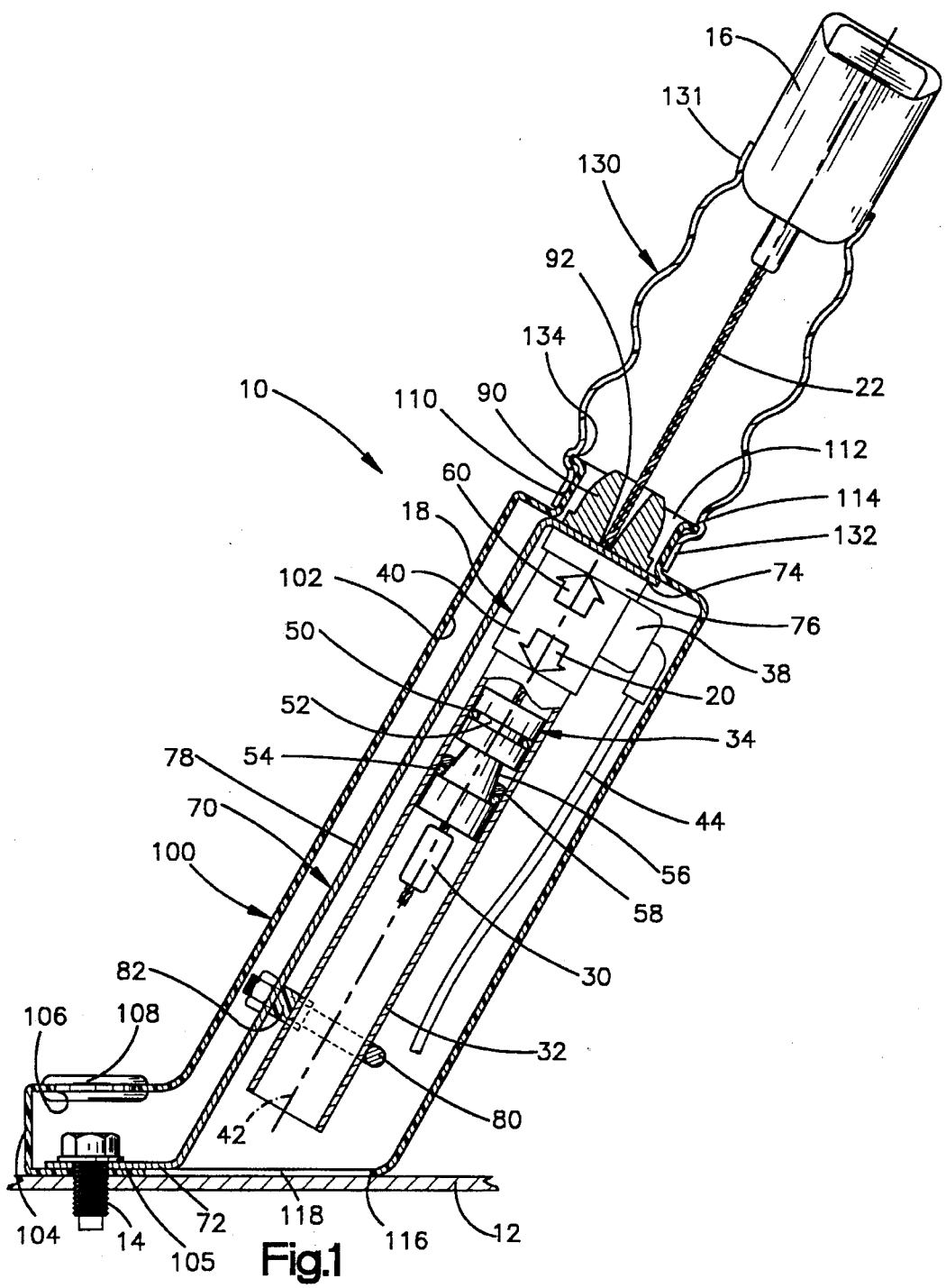
FIG. 1 is a sectional view of a belt tightener embodying the present invention.

A belt tightener 10 (FIG. 1) is connected to a vehicle 12 by a bolt 14. The belt tightener 10 is associated with a seat belt buckle 16 for receiving a tongue (not shown) that is connected to seat belt webbing (not shown) of a vehicle seat belt system. The buckle 16 is connected to a driving mechanism 18, which is a part of the belt tightener 10 and will be further described hereinafter. The driving mechanism 18 moves the buckle 16 in a first direction, represented by arrow 20, in response to a vehicle sensor (not shown) sensing a condition indicative of a collision involving the vehicle 12. One such condition is deceleration of the vehicle above a predetermined deceleration.

The driving mechanism 18 includes a cylinder 32 with a longitudinal central axis 42, a piston 34 in the cylinder, and a gas generator 38. A cable 22 extends through the cylinder 32, along the axis 42, and through a central opening in the piston 34. The cable 22 is connected at one end to the belt buckle 16 in any suitable manner, as is well known in the art. The buckle lies on the axis 42 above the cylinder 32. The end of the cable 22 opposite from the buckle 16 is connected to a stop fitting 30 located within the cylinder 32. The stop fitting 30 prevents the cable 22 from pulling out of the central opening in the piston 34.

The gas generator 38 is located adjacent an axial end portion 40 of the cylinder 32 and produces gas to move the piston 34 in the first direction 20 along the longitudinal axis 42 of the cylinder 32, as is well known in the art. The gas generator 38 is connected to the vehicle sensor (not shown) by an electrical connection 44. The sensor senses deceleration of the vehicle and sends a signal to the gas generator 38 in response to deceleration of the vehicle above a predetermined deceleration. The signal from the sensor actuates the gas generator and causes the gas generator to produce gas and thereby increase the pressure in the cylinder 32 on one side of the piston 34. The increase in pressure causes the piston 34 to move relative to the cylinder 32.

The piston 34 is located between the gas generator 38 and the stop fitting 30. The piston 34 is spaced from the stop fitting 30 prior to actuation of the gas generator 38. Upon actuation of the gas generator 38, the piston 34 moves along the longitudinal axis 42 of the cylinder 32 into engagement with the stop fitting 30. The piston 34 and the stop fitting 30 then move the cable 22 and buckle 16 in the first direction 20 from the position shown in FIG. 1 to the position shown in FIG. 3 to tighten seat belt webbing attached to the tongue (not shown).

At its end adjacent the gas generator 38 and away from the stop fitting 30, the piston 34 has a circumferential O-ring groove 52. An O-ring 50 located within the groove 52 prevents gas produced by the gas generator 38 from escaping past the piston. Below the O-ring groove 52 and closer to the stop fitting 30, the piston 34 has a frustoconical ramp surface 56 that increases in diameter in a direction away from the O-ring groove 52 and toward the stop fitting. A plurality of balls 54 are located around the periphery of the frustoconical ramp surface 56. An O-ring 58 maintains the balls 54 near the larger diameter end portion of the ramp surface 56. In the drawings, the balls 54 are shown as located at the largest diameter of the frustoconical ramp surface 56. Actually, the balls 54 would be located along the ramp surface 56 spaced axially from the largest diameter of the ramp surface.

After the buckle 16, cable 22, and piston 34 have been moved in the first direction 20, they will tend to move in a second direction, represented by arrow 60, opposite to the first direction 20 from the position of FIG. 3. Movement in the second direction 60 is due to forces applied to the belt webbing by an occupant of the vehicle during a collision. Upon movement of the piston 34 in the second direction 60 opposite to the first direction 20, the balls 54 are pressed by the ramp surface 56 radially outward relative to the axis 42 against the inner wall of the cylinder 32. Movement of the piston 34 in the second direction 60 causes plastic deformation of the wall of the cylinder 32, which is preferably made of aluminum, due to engagement of the balls 54 with the wall of the cylinder, as seen in FIG. 4. When plastic deformation of the wall of the cylinder 32 occurs, work is done, and an energy transformation diminishes load peaks in the webbing to which the buckle 16 is connected. Thus, the construction of the piston 34, the balls 54, and the cylinder 32 comprise a piston return blocking mechanism, and at the same time, an energy transformer for diminishing load peaks in the webbing.

A rigid metal support member 70 (FIGS. 1 and 3) connects the belt tightener 10 and seat belt buckle 16 to the vehicle 12. The support member 70 is in the form of a strap and includes a mounting portion 72 through which the bolt 14 extends to connect the support member 70 to the vehicle 12. The support member 70 also includes a flange 74 to which a flange 76 of the driving mechanism 18 is connected. The cable 22 extends through an opening in the flange 74 and into the cylinder 32. The flange 74 extends perpendicular to the first direction 20 of movement of the buckle 16. The driving mechanism 18 is connected to the flange 74 with the longitudinal axis 42 of the cylinder 32 extending along the direction 20.

An intermediate portion 78 of the support member 70 extends from the flange 74 to the mounting portion 72. The intermediate portion 78 extends at an angle to the mounting portion 72 and parallel to the longitudinal axis 42 of the cylinder 32. A portion of the cylinder 32 spaced from the flange 74 is connected to the intermediate portion 78 by a U-bolt 80 that clamps the cylinder against a plastic seat 82.

Figure 2:
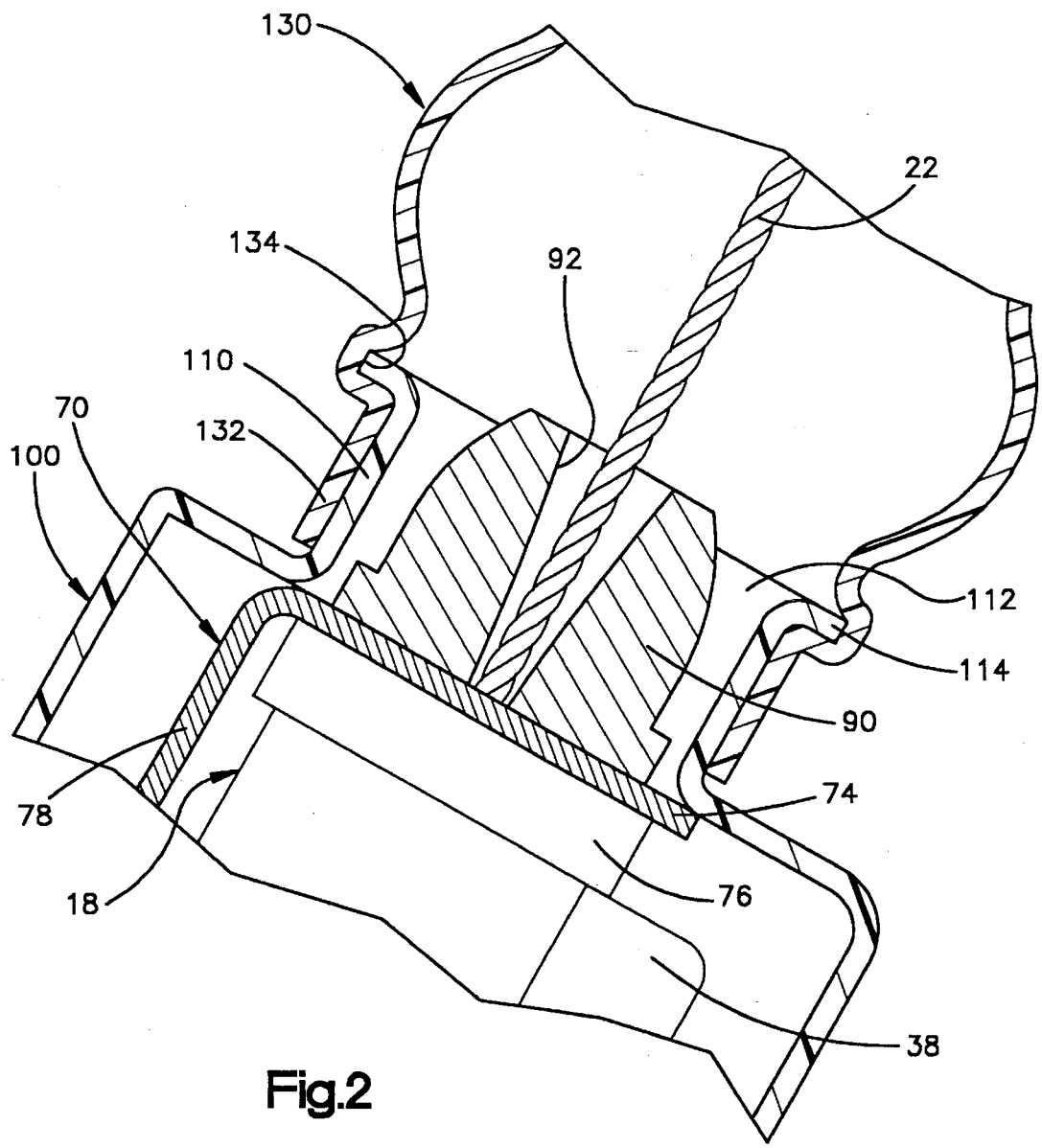
FIG. 2 is an enlarged sectional view of a portion of the belt tightener of FIG. 1 showing a connection between a cover and a boot of the belt tightener.

A plastic guide member 90 (FIG. 2) is connected to the flange 74 of the support member 70 on a side of the flange opposite from the driving mechanism 18. Preferably, the guide member 90 is connected to the flange 74 and the driving mechanism 18 by a plurality of screws (not shown). The screws extend through openings in the guide member 90 and the flange 74 and threadably engage the flange 76 of the driving mechanism 18. The screws also effectively secure the end 40 of the cylinder 32 to the flange 74. The guide member 90 has a frustoconical opening 92 for guiding the cable 22 into the cylinder 32. The frustoconical opening 92 has a first diameter located adjacent the flange 74 and a second diameter, larger than the first diameter, located away from the flange 74.

A protective cover 100 (FIGS. 1 and 3) defines a chamber 102 in which the support member 70 and the driving mechanism 18 are located. Preferably, the cover 100 is made of blow molded polypropylene or any other suitable material. The cover 100 includes a mounting portion 104 which encloses the mounting portion 72 of the support member 70. The mounting portion 104 includes a first opening through which the bolt 14 extends to connect the cover 100 to the vehicle frame 12. The bolt 14 clamps a wall 105 of the mounting portion 104 of the cover 100 between the mounting portion 72 of the support member 70 and the vehicle 12.

The mounting portion 104 has a second opening 106 aligned with the first opening through which the bolt 14 extends. A tool can be inserted through the opening 106 to screw the bolt 14 into the vehicle 12 to connect the belt tightener 10 to the vehicle. A decorative plug 108 closes the opening 106.

The cover 100 includes a bottom wall 116 that engages the vehicle 12. The bottom wall has an opening 118. The support member 70 with the driving mechanism 18 and the guide member 90 attached is inserted into the chamber 102 through the opening 118. A surface of the vehicle 12 closes the opening 118 when the bolt 14 connects the belt tightener 10 to the vehicle frame.

A generally cylindrical neck 110 (FIG. 2) of the cover 100 circumscribes the guide member 90. The neck 110 defines an opening 112 through which the cable 22 extends. The opening 112 is defined by an annular flange 114 of the neck 110, which extends radially outward relative to axis 42.

A flexible boot 130 (FIGS. 1 and 3) has an end portion 131 that abuttingly and tightly engages the buckle 16. The boot 130 extends from the buckle 16 to the neck portion 110 of the cover 100. The boot 130 is preferably made of an elastomeric material so that the boot folds up in an accordion-like manner when the buckle moves in the first direction 20, as seen in FIG. 3.

The boot 130 includes a neck portion 132 (FIG. 2) circumscribing the neck portion 110 of the cover 100. The boot 130 also has a groove 134 into which the annular flange 114 of the cover 100 extends to connect the boot 130 to the cover 100. The neck portion 132 of the boot 130 is radially expanded and placed over the neck portion 110 of the cover 100 so that the annular flange 114 of the cover is received in the groove 134 to secure the boot 130 to the cover 100.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a member for connection to vehicle seat belt webbing;

driving means for moving said member in a first direction in response to a vehicle collision, said driving means including a piston located within a cylinder and means for moving said piston along a longitudinal axis of said cylinder;

means for interconnecting said piston and said member;

a support member including a mounting portion to be connected to a vehicle and an intermediate portion extending from said mounting portion, said cylinder being fixedly connected to said support member with the longitudinal axis of said cylinder extending along the first direction, said intermediate portion of said support member extending substantially parallel to the longitudinal axis of said cylinder and spaced laterally from said cylinder; and means for connecting a portion of said cylinder to said intermediate portion of said support member.

2. Apparatus as set forth in claim 1 further including a cover having surface means defining a chamber, said support member and said driving means being located in said chamber.

3. Apparatus as set forth in claim 2 further including a flexible boot into which said interconnecting means extends, said boot being connected to said cover and extending between said cover and said member.

4. Apparatus comprising:

a member for connection to vehicle seat belt webbing;

driving means for moving said member in a first direction in response to a vehicle collision, said driving means including a piston located within a cylinder and means for moving said piston along a longitudinal axis of said cylinder;

means for interconnecting said piston and said member;

a support member including a mounting portion to be connected to a vehicle and an intermediate portion extending from said mounting portion, said cylinder being fixedly connected to said support member with the longitudinal axis of said cylinder extending along the first direction, said intermediate portion of said support member extending substantially parallel to the longitudinal axis of said cylinder and spaced laterally from said cylinder; and a guide member having a frustoconical opening through which said interconnecting means extends for guiding said interconnecting means into said cylinder, said guide member being connected to said support member.

5. Apparatus as set forth in claim 4 wherein said frustoconical opening has a first diameter located adjacent said support member and a second diameter larger than the first diameter located away from said support member toward said member.

6. Apparatus as set forth in claim 1 wherein said mounting portion extends at an angle to said intermediate portion.

7. Apparatus as set forth in claim 1 wherein said means for moving said piston in the first direction along the longitudinal axis of said cylinder includes gas generating means for producing gas in response to a vehicle collision.

8. Apparatus as set forth in claim 7 wherein said interconnecting means comprises a cable extending through said piston and connected to a stop fitting located in said cylinder on a side of said piston opposite from said gas generating means, said piston being spaced from said stop fitting prior to said gas generating means producing gas in response to a vehicle collision.

9. Apparatus as set forth in claim 1 wherein said member comprises a buckle for receiving a tongue connected with belt webbing.

10. Apparatus comprising:

a member for connection to vehicle seat belt webbing;

driving means for moving said member in a first direction in response to deceleration of a vehicle above a predetermined deceleration;

means for interconnecting said member and said driving means;

a support member for supporting said driving means, said support member including a mounting portion adapted to be connected to a vehicle;

a cover defining a chamber, said support member and said driving means being located in said chamber; and a flexible boot connected to said cover into which said interconnecting means extends, said boot extending between said member and said cover, one of said cover and said boot including a groove and another of said cover and said boot having a projection extending into said groove to interconnect said cover and said boot.

11. Apparatus as set forth in claim 10 wherein said cover includes surface means defining an opening through which said interconnecting means extends, said boot including a portion circumscribing said opening.

12. Apparatus as set forth in claim 11 wherein said boot includes said groove and said cover includes a radially outward extending annular flange defining said projection, said annular flange defining said opening in said cover through which said interconnecting means extends.

13. Apparatus comprising:

a member for connection to vehicle seat belt webbing;

driving means for moving said member in a first direction in response to deceleration of a vehicle above a predetermined deceleration;

means for interconnecting said member and said driving means;

a support member for supporting said driving means, said support member including a mounting portion adapted to be connected to a vehicle;

a cover defining a chamber, said support member and said driving means being located in said chamber; and a flexible boot connected to said cover into which said interconnecting means extends, said boot extending between said member and said cover;

said support member including a flange extending transverse to the first direction having an opening through which said interconnecting means extends, said driving means including a piston located within a cylinder and means for moving said piston along a longitudinal axis of said cylinder, said driving means being connected to said flange with a longitudinal axis of said cylinder extending along the first direction.

14. Apparatus as set forth in claim 13 wherein said support member includes an intermediate portion extending between said flange and said mounting portion parallel to the longitudinal axis of said cylinder, said cylinder being connected to said intermediate portion at a location spaced from said flange.

15. Apparatus as set forth in claim 14 further including a guide member having surface means defining a frustoconical opening through which said interconnecting means extends for guiding said interconnecting means into said cylinder.

16. Apparatus as set forth in claim 15 wherein said cover includes a portion circumscribing said guide member.

17. Apparatus comprising:

a member for connection to vehicle seat belt webbing;

driving means for moving said member in a first direction in response to deceleration of a vehicle above a predetermined deceleration;

means for interconnecting said member and said driving means;

a support member for supporting said driving means, said support member including a mounting portion adapted to be connected to a vehicle;

a cover defining a chamber, said support member and said driving means being located in said chamber; and a flexible boot connected to said cover into which said interconnecting means extends, said boot extending between said member and said cover;

said mounting portion of said support member including surface means defining an opening through which a fastener is extendable to connect said support member to the vehicle frame, said cover including a mounting portion covering said mounting portion of said support member, said mounting portion of said cover including surface means defining a first opening through which the fastener is extendable to connect said cover to said support member and the vehicle frame, said mounting portion of said cover including surface means defining a second opening aligned with the first opening through which a tool can be inserted for engaging the fastener to connect said cover to said support member and the vehicle frame.

18. Apparatus as set forth in claim 17 further including a plug means for closing the second opening.

19. Apparatus comprising:

a member for connection to vehicle seat belt webbing;

driving means for moving said member in a first direction in response to deceleration of a vehicle above a predetermined deceleration;

means for interconnecting said member and said driving means;

a support member for supporting said driving means, said support member including a mounting portion adapted to be connected to a vehicle;

a cover defining a chamber, said support member and said driving means being located in said chamber; and a flexible boot connected to said cover into which said interconnecting means extends, said boot extending between said member and said cover;

said mounting portion of said support member including surface means defining an opening through which a fastener is extendable to connect said support member to the vehicle frame, said cover including a mounting portion covering said mounting portion of said support member, said mounting portion of said cover including surface means defining a first opening through which the fastener is extendable to connect said cover to said support member and the vehicle frame and a portion clamped between said mounting portion of said support member and the vehicle frame when the fastener connects said cover and said support member to the vehicle frame.

20. Apparatus comprising:

a member for connection to vehicle seat belt webbing;

driving means for moving said member in a first direction in response to deceleration of a vehicle above a predetermined deceleration;

means for interconnecting said member and said driving means;

a support member for supporting said driving means, said support member including a mounting portion adapted to be connected to a vehicle;

a cover defining a chamber, said support member and said driving means being located in said chamber; and a flexible boot connected to said cover into which said interconnecting means extends, said boot extending between said member and said cover;

said cover including surface means defining an opening in a wall of said cover through which said support member and said driving means are inserted to position said support member and said driving means in said chamber defined by said cover, said wall through which said opening extends being engageable with a surface of the vehicle to close said opening in said wall.

21. Apparatus comprising:

a member for connection to vehicle seat belt webbing;

a cylinder;

a piston located within said cylinder;

means for interconnecting said piston and said member;

means for moving said piston in a first direction along a longitudinal axis of said cylinder relative to said cylinder to move said member in the first direction;

a support member including a mounting portion connectable to a vehicle and an intermediate portion extending parallel to the longitudinal axis of said cylinder, said intermediate portion extending at an angle to said mounting portion;

said cylinder being fixedly mounted on said support member with the longitudinal axis of said cylinder extending along the first direction;

a cover defining a chamber, said support member and said cylinder being located in said chamber;

a flexible boot connected to said cover into which said interconnecting means extends, said boot extending between said member and said cover; and means for fixedly connecting a portion of said cylinder to said intermediate portion of said supporting member.

* * * * *